United States Patent [19]

Hageman et al.

[11] Patent Number: 4,784,567

[45] Date of Patent: Nov. 15, 1988

[54] VEHICLE RESTRAINT UTILIZING A FLUID CYLINDER

[75] Inventors: Martin P. Hageman, Mequon; Jonathan W. Kovach, Milwaukee, both of Wis.

[73] Assignee: Kelley Company Inc., Milwaukee, Wis.

[21] Appl. No.: 35,229

[22] Filed: Apr. 6, 1987

Related U.S. Application Data

[63] Continuation of Ser. No. 800,150, Nov. 20, 1985, abandoned.

[51] Int. Cl.⁴ .............................................. B65G 69/00
[52] U.S. Cl. .................................... 414/401; 14/71.1
[58] Field of Search ................... 414/401, 396, 584; 14/71.1

[56] References Cited

U.S. PATENT DOCUMENTS

| 2,637,454 | 5/1953 | Rowe | 414/401 X |
| 2,693,284 | 11/1954 | Gernhardt | 414/584 |
| 4,127,856 | 11/1978 | Bickel | 340/687 |
| 4,148,498 | 4/1979 | Taylor | 280/482 |
| 4,373,847 | 2/1983 | Hipp | 414/401 |
| 4,443,150 | 4/1984 | Hahn et al. | 414/401 |
| 4,488,325 | 12/1984 | Bennett et al. | 14/71.3 |
| 4,555,211 | 11/1985 | Metz | 414/401 |

Primary Examiner—Robert J. Spar
Assistant Examiner—Stuart J. Millman
Attorney, Agent, or Firm—Andrus, Sceales, Starke & Sawall

[57] ABSTRACT

An improved vehicle restraint for preventing movement of a vehicle, such as a truck away from a loading dock during a loading operation. The vehicle restraint includes a guide frame mounted on the front face of the loading dock and a hook is disposed to move vertically on the guide frame between a lower inoperative position and an upper operative position where the hook engages an abutment on the vehicle. The hook is moved between the inoperative and operative positions by a fluid cylinder assembly, including a cylinder which is disposed in a recess in the driveway adjacent the loading dock, and the piston rod of the fluid cylinder assembly is connected to the hook. By introducing fluid into the lower end of the cylinder, the piston rod will be extended to move the hook to the operative position. The compressible nature of the fluid in the cylinder enables the hook to follow rising and falling of the truck bed during the loading operation.

9 Claims, 2 Drawing Sheets

VEHICLE RESTRAINT UTILIZING A FLUID CYLINDER

This is a continuation of application Ser. No. 800,150, filed Nov. 20, 1985, now abandoned.

BACKGROUND OF THE INVENTION

Vehicle restraints have been employed to prevent accidental movement of a truck away from a loading dock during a loading operation. When the truck is parked in front of the loading dock, the rear end of the truck completely encloses the doorway in the loading dock with the result that the truck driver cannot observe the loading or unloading of cargo from the truck by a lift truck or other mechanical handling equipment. To prevent the truck from accidentally pulling away from the dock before the loading or unloading operation is completed, vehicle restraints have been use which are mounted on the loading dock and engage the ICC bar located at the rear end of the truck.

Certain types of vehicle restraints employ a pivoting hook that is pivoted either manually or through mechanical means from the storage position to the locking position where it will engage the ICC bar.

Other vehicle restraints, such as disclosed in U.S. Pat. No. 4,488,325 employ a linear moving hook which is moved vertically along the front face of the dock from a lower storage position to an upper locking position. In the vehicle restraint, as described in the aforementioned patent, an electric motor is mounted on the hook and operates through a gear transmission to rotate a pinion which is engaged with a rack mounted on the loading dock. With this construction, operation of the pinion and rack mechanism will drive the hook upwardly and downwardly between the lower inoperative position and the upper operative position where the hook is engaged with the ICC bar.

During a loading operation, the truck bed may rise and fall relative to the dock as a fork lift truck moves between the dock and the truck bed. The truck bed will also rise relative to the dock as cargo is unloaded from the truck bed, and conversely, the truck bed will fall relative to the dock as cargo is loaded onto the truck bed and the truck springs are compressed. It is important that a vehicle restraint have the capability of maintaining the hook in engagement with the ICC bar as the truck bed floats relative to the dock. In certain instances, depending upon the type of truck, the float can be up to ten inches.

SUMMARY OF THE INVENTION

The invention is directed to an improved vehicle restraint for preventing accidental movement of a truck away from a loading dock during a loading or unloading operation. In accordance with the invention, the vehicle restraint includes a guide frame mounted on the front face of the dock, and a restraining member, such as a hook, is disposed to move vertically on the guide frame between a lower inoperative position and an upper operative position where the hook is engaged with the ICC bar of the truck.

The hook is moved between the inoperative and operative positions by a fluid cylinder mechanism, including a cylinder that is mounted within a recess or hole in the driveway adjacent the front face of the dock. The upper end of a ram, which is slidable within the cylinder, is pivotally connected to the hook. By introducing a fluid, such as air, into the lower end of the cylinder, the ram will be extended to move the hook from the inoperative to the operative position where the hook will engage the ICC bar. Due to the compressible nature of the fluid within the cylinder, the hook can be moved downwardly by the ICC bar to follow downward float of the truck bed, and conversely the fluid pressure in the cylinder will enable the hook to move upwardly to follow upward float of the ICC bar and truck bed.

The invention provides a simple and inexpensive device for securely restraining a vehicle, such as a truck, from movement away from a loading dock, and the fluid cylinder will automatically enable the hook to follow both upward and downward float of the truck bed to maintain the hook in engagement with the ICC bar at all times.

The fluid cylinder mechanism can be operated through controls located on the loading dock, or alternately, the fluid cylinder mechanism can be tied in with the operation of a dockboard or dock leveler which is utilized to bridge the gap between the loading dock and the truck bed.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
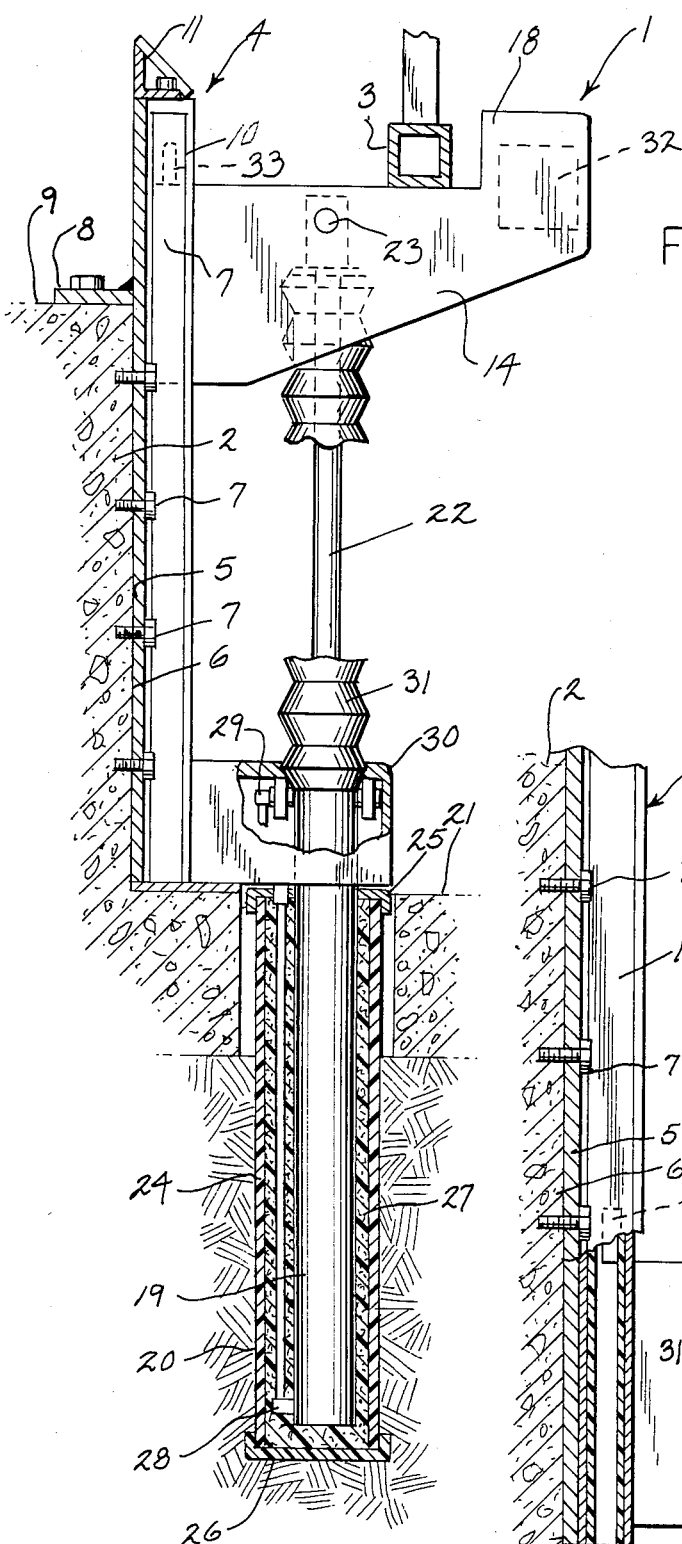
FIG. 1 is a side elevation of the vehicle restraint of the invention with the hook shown in the lower inoperative position.

The drawings illustrate vehicle restraint 1 to be mounted on a loading dock 2 and adapted to engage the ICC bar 3 of a truck 4 to prevent the truck from accidentally moving away from the loading dock during a loading operation. The ICC bar is a bar or beam that extends horizontally across the rear of the truck beneath the truck bed and is intended to prevent an automobile from under-riding the truck in the event of a rear end collision.

Vehicle restraint 1 includes a frame or supporting structure 4 composed of a vertical mounting plate 5 secured to the front face 6 of dock 2 by anchor bolts 7. The upper end of plate 5 is welded to a plate 8 that is mounted in the bottom of pit 9 formed in dock 2. An adjustable dockboard or dock leveler, not shown, is adapted to be mounted in pit 9.

A guide mechanism is associated with the plate 5 and takes the form of a pair of vertical guide channels 10 which are located in spaced relation on the plate 5. An angle 11 connects the upper ends of guide channels 10.

Figure 2:
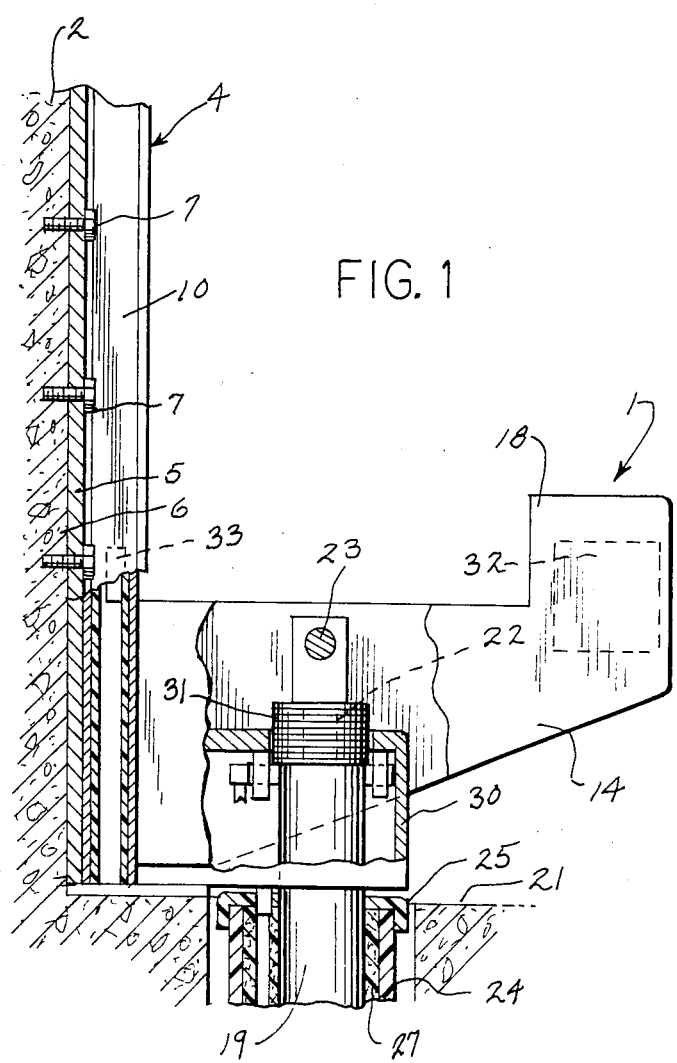
FIG. 2 is a view similar to FIG. 1 showing the hook in the upper operative position where it is engaged with the ICC bar of a truck.
Figure 3:
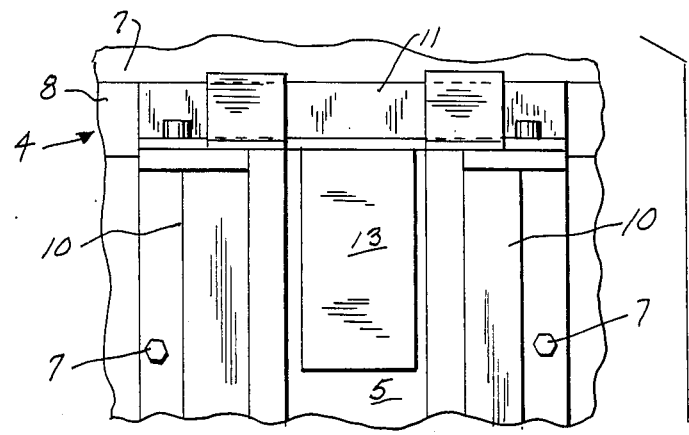
FIG. 3 is a front elevation of the structure shown in FIG. 1.
Figure 3:
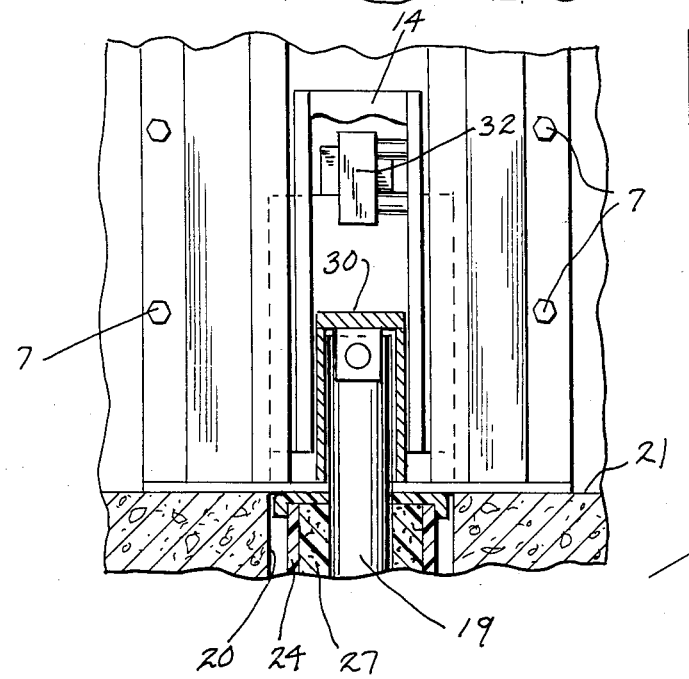
Figure 4:
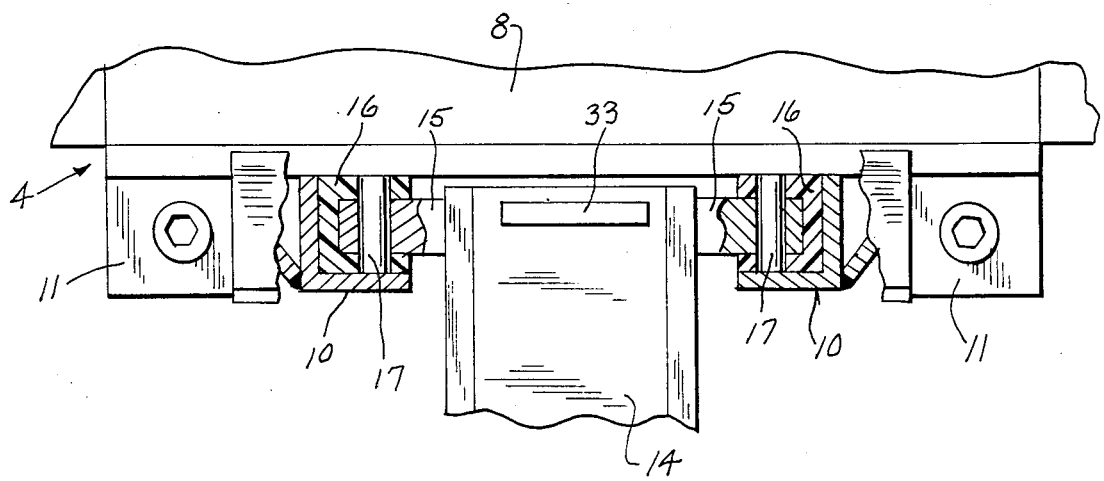
FIG. 4 is a top plan view of the hook assembly with parts broken away.

Mounted for vertical movement in the guide channels 10 is a hook assembly which includes a hook 14 that is adapted to engage the ICC bar 3 as illustrated in FIG. 2. Hook assembly also includes a pair of guide bars 15 that extend outwardly from opposite sides of hook 13 and are mounted for vertical sliding movement in guide channels 10, and U-shaped plastic wear strips 16 can be secured to bars 15 by pins 17 to reduce the frictional sliding contact.

Hook 14 includes an upwardly extending outer tip 18 which, as shown in FIG. 2, prevents the ICC bar from moving outwardly away from the dock when the hook is in the operative position.

To move the hook between the inoperative and operative positions, a fluid cylinder mechanism is utilized. Fluid cylinder mechanism includes a cylinder 19 which is mounted in a recess or hole 20 in the driveway 21 located adjacent the front face 6 of loading dock 20. A piston is slidable within the cylinder and carries a piston rod 22 that is pivotally connected to hook 15 at pivot 23. As shown in FIGS. 1 and 2, the upper end of cylinder 19 projects above the level of driveway 21.

Cylinder 19 is positioned in a plastic pipe 24, the ends of which are enclosed by caps 25 and 26. Cylinder 19 extends through an opening in upper cap 26. A layer of cushioning material 27, such as polyurethane foam, is located in the space between cylinder 19 and pipe 24. The foam layer 27 serves to protect the cylinder, as well as preventing moisture and water from entering the pipe and contacting the cylinder.

A compressible fluid, such as air, is introduced into the opposite ends of cylinder 19 through lines 28 and 29. By introducing air into the lower end of the cylinder 19 through line 28, piston rod 22 will be extended to move hook 15 into engagement with ICC bar 3 to thereby prevent the truck from moving away from the dock during the loading operation. Conversely, by introducing air into the upper end of cylinder 19 through line 29, the piston rod 22 will be retracted to thereby move the hook 15 from the operative to the inoperative lower position.

A cover plate 30 can be secured to the lower end of frame 5 and, encloses the upper end of cylinder 19 and fluid connection 29.

To prevent contamination of the piston rod with foreign materials, an expandable bellows-like sleeve of fabric or plastic material 31 can be connected between the cover 30 and the upper end of piston rod 22.

After a truck backs toward the loading dock for a loading operation, the operator on the dock can actuate the necessary controls to supply air to the lower end of cylinder 19 to thereby extend the piston rod 22 and move hook 15 into engagement with the ICC bar 3 to prevent the truck from moving away from the dock during the loading operation. Alternately, the operation of the cylinder 19 can be tied in with the operation of a dockboard which is mounted within pit 9 in the loading dock. As described in U.S. Pat. No. 4,488,325 movement of the lip of the dockboard from the pendant to the extended position can serve to actuate the fluid cylinder 19 to extend piston rod 22 and move the hook to the operative position.

The vehicle restraint also includes a sensing mechanism for sensing the engagement of the ICC bar with the hook 15 and transmitting a signal to the operator on the loading dock to indicate that the ICC bar is properly hitched with the hook. The sensing mechanism can take the form of an infrared photoelectric eye The eye 32 is adapted to emit an infrared beam which is reflected from reflector 33 mounted on the inner end of the hook. The presence of the ICC bar in the hooked condition will interrupt the beam to generate a signal to inform the operator that the ICC bar is properly hitched. The signal can take the form of a "hitched" and "unhitched" sign which is located on the loading dock.

If the truck bed should lower relative to the dock during the loading operation, due to cargo being applied to the truck bed, the air in cylinder 19 will compress to thereby enable the hook 15 to follow the downward movement or float of the truck bed and ICC bar. Conversely, if the truck bed and ICC bar should move upwardly during the loading operation, pressure in cylinder 19 will cause the piston rod 22 to extend to follow the upward float. Thus, the fluid cylinder mechanism will automatically follow upward and downward float of the truck bed to maintain the hook in engagement with the ICC bar during the loading operation.

The vehicle restraint of the invention substantially reduces the number of components and moving parts over conventional vehicle restraints, as used in the past.

As the fluid cylinder is encapsulated by the plastic material 27 in the protective pipe 24, it is sealed against the entry of water or moisture to thereby ensure trouble-free operation of the fluid cylinder mechanism.

While the above description has illustrated the cylinder unit 19 as a gas cylinder, it is contemplated that a hydraulic cylinder can also be used, in which case an accumulator can be incorporated in the hydraulic system to enable the hook to follow bi-directional float.

Various modes of carrying out the invention are contemplated as being within the scope of the following claims particulary pointing out and distinctly claiming the subject matter which is regarded as the invention.

We claim:

1. In combination a loading dock having a vertical face, a driveway extending horizontally from the lower end of said face, guide means mounted on said face, a hook mounted for sliding vertical movement on said guide means between a lower inoperative position where the hook is disposed adjacent the driveway and an upper operative position where the hook is disposed to be engaged by an abutment on a truck to prevent the truck from moving away from said loading dock, said driveway having a generally vertical recess, a cylinder mounted in said recess, a ram slidable within said cylinder, the upper end of said ram being connected to said hook, means for supplying a compressible gas to said cylinder, introducing said gas to the lower end of the cylinder acting to extend said ram to thereby move the hook in a linear path from the inoperative to the operative positions, downward movement of said abutment during a loading operation serving to compress said gas in said cylinder to enable said hook to follow downward movement of said abutment.

2. The combination of claim 1, and including a pipe spaced radially outward from said cylinder and disposed within said recess, and a layer of sealing material disposed within the space between said cylinder and said pipe to seal said cylinder against the entry of liquid.

3. The combination of claim 2, wherein said sealing material is polyurethane foam.

4. The combination of claim 1, and including sensing means mounted on said hook for sensing the engagement of said hook with said abutment, said sensing means being constructed and arranged to generate a signal indicating engagement of said hook with said abutment.

5. The combination of claim 4, wherein said sensing means comprises a photoelectric eye to emit a light beam and a reflector disposed in the path of said beam, said eye being located at one end of said hook and said reflector being located at the other end of said hook.

6. In combination, a loading dock having a vertical face, a driveway extending horizontally from the lower end of said vertical face, guide means mounted on said face, a hook mounted for sliding vertical movement on said guide means between a lower inoperative position and an upper operative position where the hook is disposed to engage an abutment on a truck to prevent the truck from pulling away from said loading dock, said driveway having a generally vertical recess, fluid cylinder means mounted in said recess and including an extendible member connected to said hook, means for introducing a fluid to said fluid cylinder means to extend said extendible member and move the hook from the inoperative to the operative positions, a tubular member disposed within the recess and spaced radially outward from said fluid cylinder means, and a layer of sealing material disposed within the space between said tubular member and said fluid cylinder means, said tubular member and said fluid cylinder means comprising an integral unit removable from said recess.

7. The combination of claim 1, and including expandible shield means interconnecting the upper end of said ram and said cylinder and enclosing said ram, said shield means being expandible as said ram is extended.

8. In combination, loading dock means having a generally vertical dock face and having a horizontal driveway extending from said face, said driveway having a generally vertical recess, telescopic operating means including a first member secured within the recess and a second member disposed to move relative to said first member between a retracted position and an extended position, the upper end portion of said second member defining truck restraining means disposed to be positioned outwardly of an abutment on a truck parked in front of said loading dock means when said second member is in said extended position to prevent the truck from moving away from said loading dock means, and means for biasing said second member to the fully extended position whereby said second member can move downwardly from the extended position when a predetermined downward external force is applied to said truck restraining means.

9. The combination of claim 8, wherein said first member has an outer surface disposed in sealed relation with the portion of said loading dock means bordering said recess.

* * * * *